United States Patent [19]

White et al.

[11] 3,731,071
[45] May 1, 1973

[54] MINIMUM OPERATING PRESSURE CONTROL SYSTEM AND METHOD FOR CONTROLLING A PRODUCT SEPARATOR IN A CATALYTIC REFORMING UNIT

[75] Inventors: William D. White, Nederland; Walker L. Hopkins, Groves, both of Tex.

[73] Assignee: Texaco Inc., New York, N.Y.

[22] Filed: June 3, 1971

[21] Appl. No.: 149,596

[52] U.S. Cl............235/151.12, 208/DIG. 1, 208/134
[51] Int. Cl..............................G06g 7/58, C10g 35/04
[58] Field of Search......................235/151.12, 150.1; 208/134, 89, 100, DIG. 1

[56] References Cited

UNITED STATES PATENTS

| | | | |
|---|---|---|---|
| 2,898,288 | 8/1959 | Elliott et al. | 208/134 |
| 2,920,033 | 1/1960 | Beavon | 208/134 |
| 3,128,242 | 4/1964 | Bergstrom et al. | 208/134 X |
| 3,497,449 | 2/1970 | Urban | 235/151.12 X |
| 3,607,091 | 9/1971 | Boyd | 208/DIG. 1 X |

*Primary Examiner*—Joseph F. Ruggiero
*Attorney*—Thomas H. Whaley and Carl G. Ries

[57] ABSTRACT

A control system for maintaining the operating pressure of a product separator in a catalytic reforming unit at a minimum value so as to provide economical operation. The gas output from the product separator follows two distinct paths: one path includes a charge oil pretreating unit which provides hydrogen from the gas, the other path includes a high pressure absorber which also provides hydrogen from the gas. The pressure necessary at the product separator to provide steady flow in a path is determined for each each path in accordance with equations hereinafter described in detail. The pressures in the paths are sensed and corresponding signals provided. A network determines constraint pressures for the product separator and selects the greater constraint pressure. The control system maintains the product separator at that pressure.

10 Claims, 2 Drawing Figures

MINIMUM OPERATING PRESSURE CONTROL SYSTEM AND METHOD FOR CONTROLLING A PRODUCT SEPARATOR IN A CATALYTIC REFORMING UNIT

BACKGROUND OF THE INVENTION

1. Field of the Invention

The present invention relates to control systems and, more particularly, to a control system for a catalytic reforming unit.

2. Description of the Prior Art

Heretofore, the operating pressure of a product separator in a catalytic reforming unit was maintained at a value which provides a satisfactory flow of gas from the product separator at all times. Since the gas from the product separator follows different paths and conditions along these paths vary from time to time, the pressure in the product separator was generally maintained substantially above a minimum pressure necessary to provide gas flow.

The present invention controls the pressure in the product separator so that a substantially minimum pressure is maintained to provide economical operation of the catalytic reforming unit. The minimum pressure is controlled in accordance with the conditions along the gas paths.

SUMMARY OF THE INVENTION

A system controls the pressure of a product separator receiving effluent from a catalytic reforming reactor and providing gas to a charge oil pretreating unit and to an absorber. The pretreating unit and the absorber effectively extract hydrogen from the gas. The control system includes a plurality of sensors. A first sensor provides a signal corresponding to a sensed pressure in the product separator. Second and third sensors provide signals corresponding to the sensed pressure of the hydrogen and the sensed pressure of the gas flowing to the pretreating unit, respectively. A source provides at least two signals, one signal corresponds to a product separator pressure that is required to maintain a steady gas flow, for substantially zero hydrogen pressure, to the pretreating unit and to the absorber. The signals from the sensors and the signal source are used by a network to develop a control signal. A device controls the pressure in the product separator in accordance with the control signal.

One object of the present invention is to maintain the operating pressure in a product separator of a catalytic reforming unit at a minimum value regardless of changes in conditions affecting gas leaving the product separator.

Another object of the present invention is to determine minimum constraint pressures for a product separator and to maintain the operating pressure in the product separator at the highest minimum constraint pressure.

Another object of the present invention is to control a product separator's operating pressure in accordance with determined product separator pressures which provide a steady gas flow condition and with sensed operating pressures.

Another object of the present invention is to use an integrator to provide a control signal to smooth out abrupt changes that may occur in an unintegrated control signal.

The foregoing and other objects and advantages of the invention will appear more fully hereinafter from a consideration of the detailed description which follows, taken together with the accompanying drawings wherein two embodiments of the invention are illustrated by way of example. It is to be expressly understood, however, that the drawings are for illustration purposes only and is not to be construed as defining the limits of the invention.

DESCRIPTION OF THE INVENTION

Figure 1:
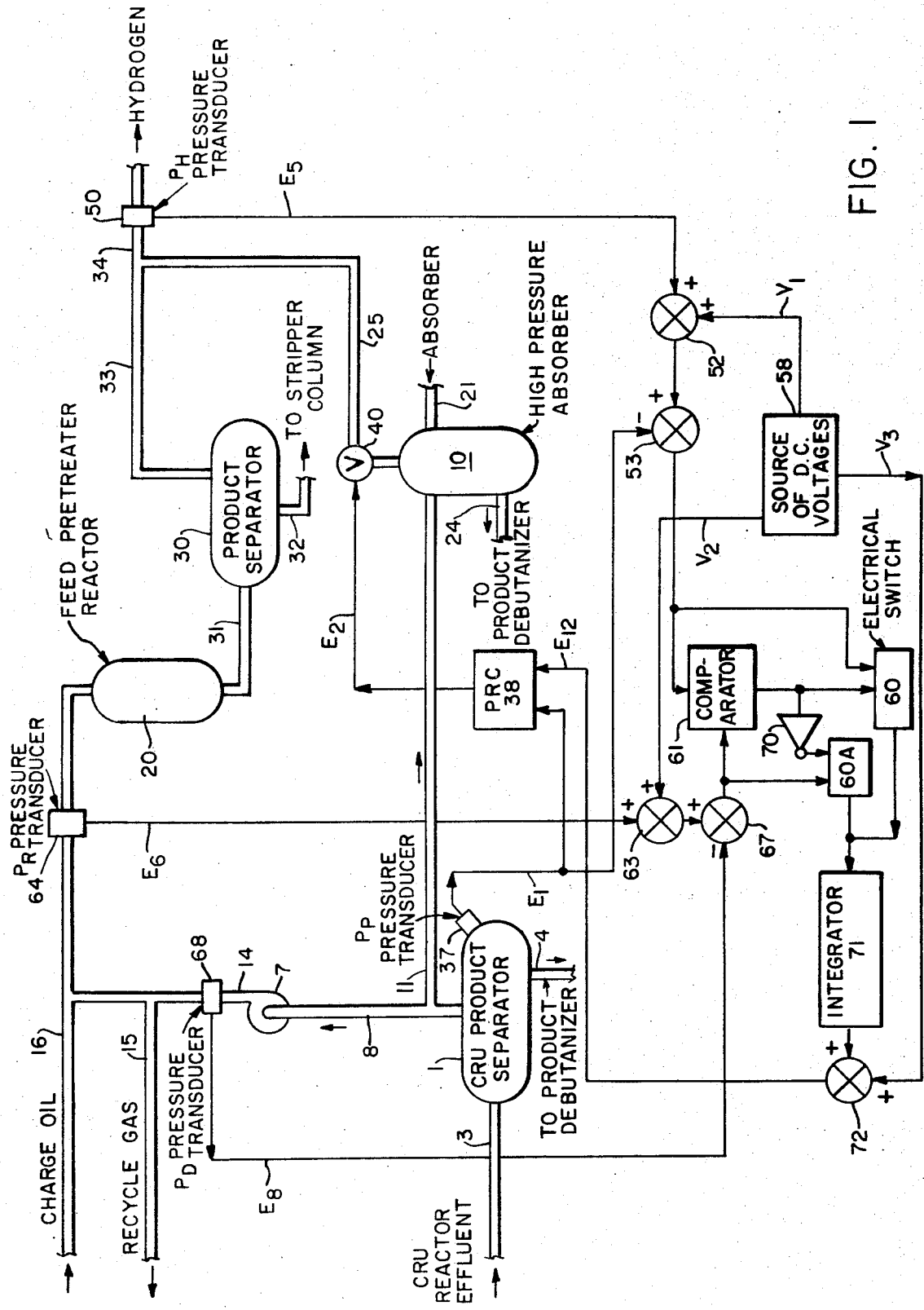
FIG. 1 includes a simplified block diagram of a system, constructed in accordance with the present invention, for controlling the operating pressure of a product separator in a catalytic reforming unit, a portion of which is shown in schematic form.
Figure 2:
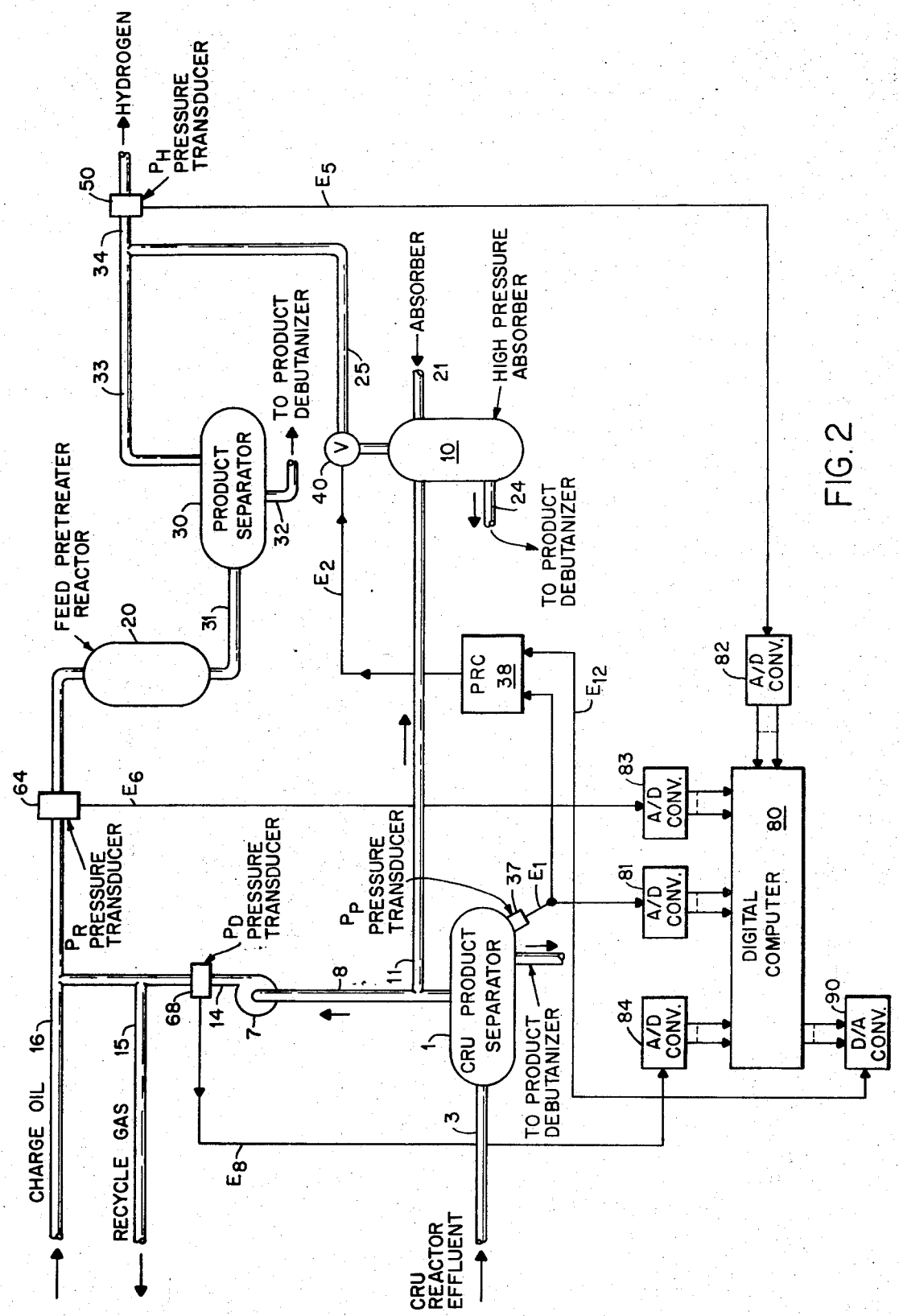
FIG. 2 shows another embodiment of the present invention, using a digital computer.

Referring to FIG. 1, the effluent from a reactor, not shown, in a catalytic reforming unit, hereinafter referred to as CRU, enters a product separator 1 through a line 3 where the effluent is transformed into a liquid and a gas. The liquid leaves separator 1 by way of a line 4 for further processing in a product debutanizer, not shown, since it is not essential to the explanation of the system of the present invention.

The gas from CRU product separator 1 is provided to a compressor 7 through a line 8 and to a high pressure absorber 10 by way of lines 8, 11. Compressor 7 pumps the gas back to the CRU reactor through lines 14, 15 as recycle gas and to a line 16, through line 14, carrying charge oil for a feed pretreater reactor 20 where the gas mixes with the charge oil.

An absorbing material enters high pressure absorber 10, through a line 21, where the absorbing material absorbs the heavier gas under pressure to provide a mix. The mix is provided to the product debutanizer through a line 24 for further processing. The gas that is not absorbed is substantially hydrogen in content, and is removed through a line 25.

Feed pretreater reactor 20 reacts the mixture of gas and charge oil in line 16 in the presence of a conventional hydrotreating catalyst, such as cobalt-molybdenum on alumina, to provide effluent to another product separator 30 by way of a line 31. The liquid from separator 30 is provided to a 1. column, which is not shown, through a line 32. Separator 30 also provides hydrogen through a line 33 to an output line 34 which also receives the hydrogen from line 25.

The pressure in product separator 1 is sensed by a conventional type pressure transducer 37 which provides a signal $E_1$, corresponding to the sensed pressure, to a conventional pressure recorder controller 38. Controller 38 provides a signal $E_2$ which corresponds to the difference between the pressure represented by signal $E_1$ and the desired pressure represented by the position of controller 38 set point. Signal $E_2$ is applied to a valve 40 which controls the flow of hydrogen in line 25. When the hydrogen flow in line 25 is increased, the pressure in product separator 1 is decreased. When the hydrogen flow in line 25 is decreased, the pressure in product separator 1 is increased.

In a closed-loop system controlling a process, it is generally necessary to use constraints to limit the range over which the control system may drive the control variables. These constraints prevent the occurrence of unsafe conditions or conditions which are known to be uneconomical. Use of unduly restrictive constraints, however, may prevent the control system from achieving the most economical operation.

In the catalytic reforming process, an excess amount of gas which is rich in hydrogen is produced in the reactor section. Generally, part of this hydrogen-rich gas is used in the feed pretreatment section and the remainder is used by other processing units such as hydrotreaters. In cases where there are no booster compressors for these gas streams, the pressure in the reactor section of the catalytic reformer must be higher than the pressure in the downstream units.

Conventionally, the product separator operating pressure is fixed at a value that will be satisfactory at all times. It is important that a minimum product separator operating pressure be used. It has been determined from empirical data that considerable economic benefits may be obtained by lowering the product separator operating pressure to a minimum value.

The constraints on product separator 1 are the minimum pressures for product separator 1 for each path and are determined in accordance with the following equations:

$$P_A = P_H + P_1 \quad (1) \text{ and}$$

$$P_B = P_R + P_P + P_2 - P_D, \quad (2)$$

where $P_A$ and $P_B$ are minimum constraint pressures for the pretreating unit gas path and for the absorber gas path, respectively, $P_D$ is compressor 7 discharge pressure, $P_H$ is the pressure in line 34, $P_P$ is the product separator 1 pressure, $P_R$ is reactor 20 inlet pressure, and $P_1$, $P_2$ are predetermined differential pressures necessary to provide a steady flow of gas through the absorber gas path and the pretreating unit gas path, respectively.

The pressure in line 34 is sensed by a conventional pressure transducer 50 which provides a corresponding signal $E_5$. Summing means 52 sums signal $E_5$ from transducer 50 with a direct current voltage $V_1$, which corresponds to the term $P_1$ in equation 1, from a source 58 of direct current voltages to provide a signal corresponding to $P_A$ to subtracting means 53. Subtracting means 53 subtracts the signal provided by summing means 52 from signal $E_1$ provided by transducer 37, to provide an error signal to an electronic switch 60 and a comparator 61. The error signal corresponds to the difference between minimum constraint pressure $P_A$ for product separator 1 and sensed pressure $P_P$ for separator 1.

Summing means 63 sums a direct current voltage $V_2$, which corresponds to the term $P_2$ in equation 2, with a signal $E_6$, corresponding to feed pretreater reactor 20 inlet pressure $P_R$, from a pressure transducer 64, which may be of a conventional type, connected to line 16. Subtracting means 67 subtracts a signal $E_8$, which corresponds to the discharge pressure $P_D$ of compressor 7, provided by a conventional pressure transducer 68 connected to line 14 from the output provided by summing means 63. Subtracting means 67 provides an error signal, corresponding to the difference between another minimum constraint pressure $P_B$ and sensed pressure $P_P$ for product separator 1, to comparator 61 and to an electronic switch 60A.

Electronic switches 60, 60A and comparator 61 comprise a network for selecting the higher signal error of the two error signals. Comparator 61 compares the outputs from summing means 53 and subtracting means 67 and provides a high level direct current output when the output from summing means 53 is equal to or more positive than the output from subtracting means 67 and a low level direct current output when the output from summing means 53 is less positive than the output from subtracting means 67. The output from comparator 61 is applied directly to switch 60 and to switch 60A through an inverter 70. Switches 60, 60A are rendered conductive and non-conductive, respectively, when comparator 61 provides a high level output so that switch 60 passes the output from summing means 53 to an integrator 71 while switch 60A blocks the output from subtracting means 67. Conversely, switches 60, 60A are rendered non-conductive, respectively, when comparator 61 provides a low level output so that switch 60A passes the output from subtracting means 67 to integrator 71 while switch 60 blocks the output from summing means 53.

Summing means 72 sums the integrated output from integrator 71 with a variable amplitude direct current voltage $V_3$, from source 58, whose amplitude corresponds to a predetermined position for the set point of pressure recorder controller 38 which is related to a predetermined desired pressure for CRU product separator 1. Integrator 71 is used to smooth out any abrupt changes in the output from switch 60 or 60A.

The output from summing means 72, which corresponds to a target pressure for product separator 1, is used to position the set point in controller 38, thereby controlling the pressure of product separator 1 as heretofore explained.

The analog computing elements may be replaced by a digital computer 80. Signals $E_1$, $E_5$, $E_6$ and $E_8$ are converted to digital signals by conventional type analog-to-digital converters 81 through 84, respectively, and applied to the digital computer 80. The digital computer solves equations 1 and 2. The digital computer subtracts the digital equivalent of signal $E_1$ from the constraint pressures to provide error signals. The set point position signal is summed with the greater error signal to provide digital signals which are converted to analog signal $E_{12}$ by a digital-to-analog converter 90.

The system of the present invention, as heretofore described, maintains the pressure in a product separator of a catalytic reforming unit at the highest determined minimum constraint pressure regardless of changes in conditions affecting gas leaving the product separator so that the pressure of the product separator is maintained at a minimum operating pressure. Minimum product separator's pressures required to maintain steady gas flow are determined and operating pressures are sensed. The system determines constraint pressures from the minimum pressures and the sensed pressures. The system includes an integrator to provide a control signal to smooth out abrupt changes that may occur in an unintegrated control signal.

What is claimed is:

1. A system for controlling the pressure in a product separator receiving effluent from a catalytic reforming reactor and providing gas to a charge oil pretreating unit and to an absorber both of which cause the gas to effectively yield hydrogen, comprising a plurality of sensors, a first sensor being connected to the product separator and providing a signal corresponding to a sensed product separator pressure $P_P$, a second sensor senses the pressure $P_H$ of the hydrogen and provides a signal corresponding thereto, and a third sensor senses the pressure of the gas flowing to the pretreating unit and provides a signal corresponding thereto; means for providing a pair of signals, one signal corresponding to a predetermined product separator pressure $P_1$ for maintaining a steady flow of gas to the absorber and of hydrogen from the absorber when the hydrogen pressure is substantially zero, the other signal corresponding to a predetermined product separator pressure $P_2$ for maintaining a steady flow of gas to the pretreating unit and of hydrogen from the pretreating unit when the hydrogen pressure is substantially zero; a network connected to the sensors and to the signal means for providing a control signal in accordance with the signals from the sensors and the signal means; and means connected to the network for controlling the pressure in the product separator in accordance with the control signal from the network.

2. A system as described in claim 1 in which a compressor pumps the gas from the product separator to a reactor in the pretreating unit, and the third sensor senses the inlet pressure $P_R$ of the reactor of the pretreating unit and provides a corresponding signal to the network; and further comprising a fourth sensor connected to the compressor and to the network and providing a signal to the network corresponding to a sensed discharge pressure $P_D$ of the gas from the compressor.

3. A system as described in claim 2 in which the hydrogen from the pretreating unit and from the absorber commingles in a common discharge line, and the second sensor senses the hydrogen pressure in the discharge line.

4. A system as described in claim 3 in which each sensor provides an analog signal; and the network includes a plurality of analog-to-digital converters, some of the converters being connected to corresponding sensors while the remaining converters are connected to the signal means, converting the analog signals to digital signals; digital computing means connected to the converters for developing minimum constraint pressure digital signals $P_A$ and $P_B$ in accordance with the following equations:

$$P_A = P_H + P_1, \quad \text{and}$$
$$P_B = P_R + P_P - P_D + P_2$$

and for subtracting the digital signal corresponding to the sensed product separator pressure from signal $P_A$ when signal $P_A$ is greater than or equal to signal $P_B$, and from signal $P_B$ when signal $P_A$ is less than signal $P_B$ to provide a digital error signal; and a digital-to-analog converter connected to the digital computing means and to the control means for converting the digital error signal from the computing means to provide an analog error signal to the control means as the control signal.

5. A system as described in claim 3 in which the network includes means connected to the signal means and to the second sensor for providing a minimum constraint pressure $P_A$ signal for the product separator in accordance with the one signal from the signal means, the signal from the second sensor and the following equation:

$$P_A = P_H + P_1,$$

second means connected to the signal means and to the third and fourth sensors for providing a minimum constraint pressure $P_B$ signal for the product separator in accordance with the other signal from the signal means and the signals from the first, third and fourth sensors and the following equation:

$$P_B = P_R + P_P - P_D + P_2,$$

switching means connected to the $P_A$ and $P_B$ signal means for selecting the signal from the $P_A$ and $P_B$ signal means corresponding to the higher constraint pressure and passing that signal, and means connected to the switching means, to the first sensor and to the control means for subtracting the product separator pressure signal provided by the first sensor from the signal passed by the switching means to provide an error signal, as the control signal, to the control means.

6. A system as described in claim 5 in which the switching means includes a comparator connected to the $P_A$ and $P_B$ signal means and providing a direct current output of one amplitude when the $P_A$ signal is equal to or more positive than the $P_B$ signal and of another amplitude when the $P_A$ signal is less positive than the $P_B$ signal, an inverter connected to the comparator and inverting the output from the comparator to provide an inverted output, a first switch connected to the comparator, to the $P_A$ signal means and to the subtracting means controlled by the output from the comparator to pass the $P_A$ signal from the $P_A$ signal means to the subtracting means when the output from the comparator is of the one amplitude and to block the $P_A$ signal when the comparator output is of the other amplitude, and a second switch connected to the inverter, to the $P_B$ signal means and to the subtracting means and controlled by the inverted output from the inverter to pass the $P_B$ signal from the $P_B$ signal means to the subtracting means when the comparator output is of the other amplitude and to block the $P_B$ signal when the comparator output is of the one amplitude.

7. A method for controlling the pressure in a product separator receiving effluent from a catalytic reforming reactor and providing gas to a charge oil pretreating unit and to an absorber, both of which cause the gas to effectively yield hydrogen, said product separator requires a predetermined minimum pressure $P_1$ to maintain a steady flow of gas to the pretreating unit and of hydrogen from the absorber for a substantially zero hydrogen pressure and another predetermined minimum pressure $P_2$ to maintain a steady flow of gas to the pretreating unit and of hydrogen from the pretreating unit for a substantially zero hydrogen pressure, which comprises sensing the pressure $P_P$ of the product separator, sensing the pressure $P_H$ of the hydrogen, sensing the pressure of the gas flowing to the pretreating unit, and controlling the product separator pressure in accordance with the sensed product separator, hydrogen and gas pressure and the predetermined minimum pressures.

8. A method as described in claim 7 which further comprises pumping the gas with a compressor from the product separator to a reactor in the pretreating unit, and sensing the reactor's inlet pressure $P_R$, and in which the sensing of the gas pressure includes sensing the pressure $P_D$ of the gas being discharged from the compressor.

9. A method as described in claim 8 in which the sensing of the hydrogen pressure occurs where the hydrogen from the pretreating unit and the hydrogen from the absorber are commingled in a common discharge line.

10. A method as described in claim 9 in which the controlling step includes determining a minimum constraint pressure $P_A$ for the product separator in accordance with the determined minimum pressure $P_1$, the sensed hydrogen pressure $P_H$ and the following equation:

$$P_A = P_H + P_1,$$

determining another minimum constraint pressure $P_B$ for the product separator in accordance with the determined minimum pressure $P_2$, the sensed pretreating reactor inlet pressure $P_R$, the sensed compressor discharge pressure $P_D$, the sensed product separator pressure $P_P$ and the following equation:

$$P_B = P_R + P_P + P_2 - P_D,$$

and maintaining the product separator pressure substantially at the constraint pressure $P_A$ when the constraint pressure $P_A$ is equal to or greater than the constraint pressure $P_B$, and substantially at the constraint pressure $P_B$ when the constraint pressure $P_A$ is less than the constraint pressure $P_B$.

* * * * *